United States Patent [19]

Okamura

[11] 4,283,786
[45] Aug. 11, 1981

[54] DIGITAL TRANSMISSION SYSTEM

[76] Inventor: Shiro Okamura, 1494 Jindaijimachi, Chofu-shi, Tokyo, Japan

[21] Appl. No.: 52,115

[22] Filed: Jun. 26, 1979

[30] Foreign Application Priority Data

Jun. 27, 1978 [JP] Japan .................................. 53/77869

[51] Int. Cl.³ ...................... G06F 11/00; H04B 17/00
[52] U.S. Cl. .......................................... 371/2; 375/34
[58] Field of Search .................. 371/2, 65, 70, 55, 56; 375/26, 34, 99, 19; 455/50, 63, 295

[56] References Cited

U.S. PATENT DOCUMENTS

| 3,471,830 | 10/1969 | McRae et al. | 371/2 |
| 3,657,699 | 4/1972 | Rocher et al. | 371/2 |
| 3,836,655 | 5/1969 | McRae | 371/2 |
| 4,041,453 | 8/1977 | Umeda et al. | 371/2 |

Primary Examiner—Charles E. Atkinson
Attorney, Agent, or Firm—Hopgood, Calimafde, Kalil, Blaustein & Judlowe

[57] ABSTRACT

A digital transmission system in which an information signal is converted into digital data in response to a sampling pulse train, the digital data comprising a plurality of bits differing in significance from each other. Data conversion, such as complementing or reversing the order of the plurality of bits, is performed in integral multiples of every other sampling period and the converted data is transmitted over the digital transmission system to a receiver where it is reconverted back into the original digital data.

7 Claims, 37 Drawing Figures

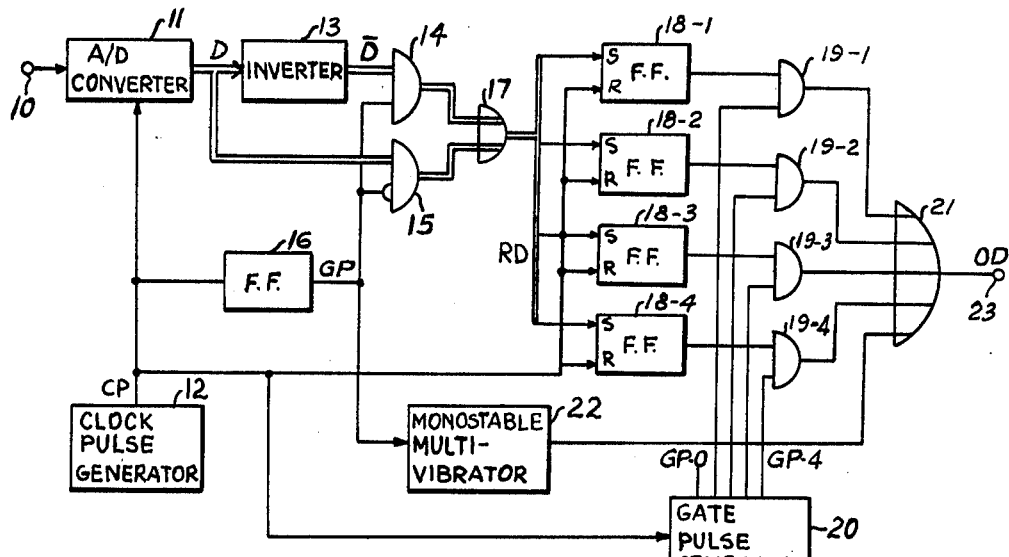
FIG. 1
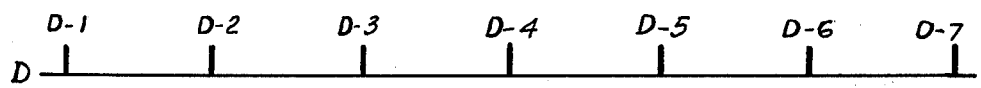
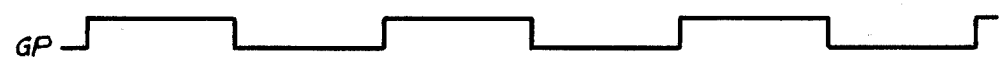
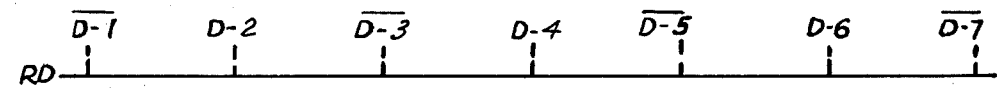
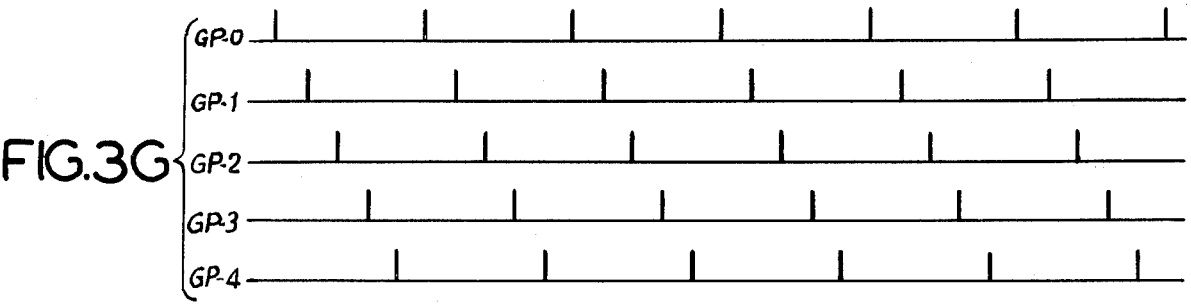
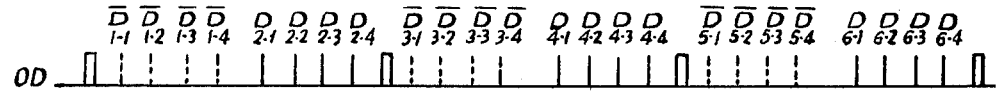

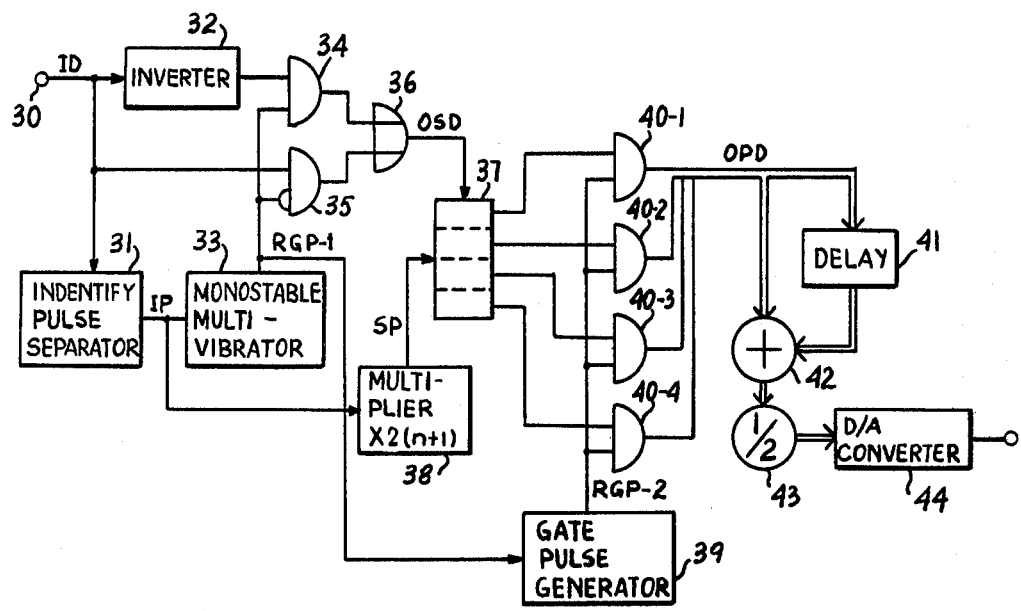
FIG. 4
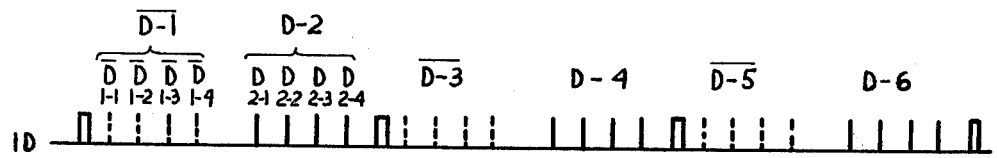
FIG. 5A ID
FIG. 5B IP
FIG. 5C RGP₁
FIG. 5D OSD
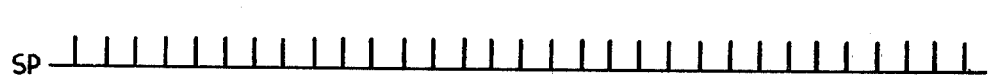
FIG. 5E SP
FIG. 5F RGP₂
FIG. 5G OPD

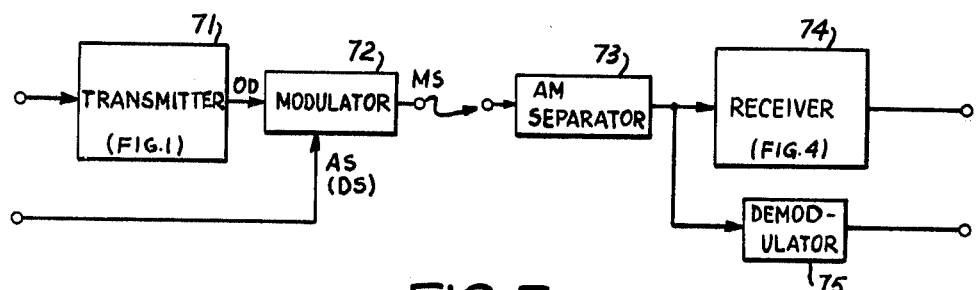
FIG.7
FIG.8A  OD
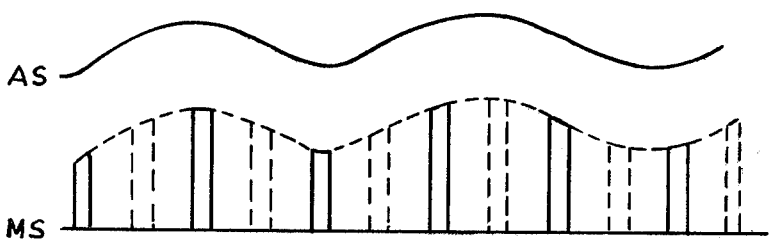
FIG.8B  AS
FIG.8C  MS
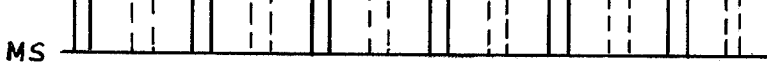
FIG.8D  DS
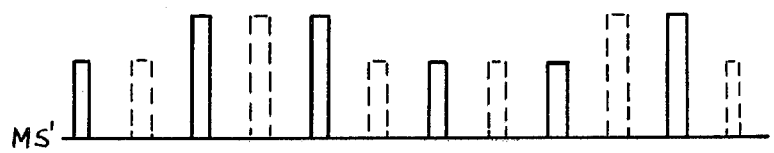
FIG.8E  MS'

FIG.11A, FIG.11B, FIG.11C, FIG.11D, FIG.11E, FIG.11F, FIG.11G, FIG.11H, FIG.11I

DIGITAL TRANSMISSION SYSTEM

FIELD OF THE INVENTION

This invention relates to a digital transmission system in which an information signal is converted into digital data and transmitted through a transmission path or recorded on a recording medium, and more particularly, to a transmissionerror reducing system effective to reduce transmission errors resulting from noise, interference and drop out.

BACKGROUND OF THE INVENTION

Generally, in a digital transmission system, an information signal is converted into digital data including, as representative thereof, a plurality of bits differing in significance from each other. The plurality of bits are transmitted through a transmission path or recorded on a recording medium. Transmission problems, such as noise, interference, and drop out, results in errors in the received or reproduced digital data. The extent of the transmission problem depends upon the significance of the bit which is subjected to the transmission problem. For example, if the transmission problem occurs in the least significant bit (LSB), an error is produced of $V/2^n$, wherein V is the maximum amplitude of the information signal and n is the number of bits representing the information signal. In this case, since the error is relatively low, the transmission problem is extremely limited and causes little or no transmission degradation. On the other hand, if a transmission problem occurs in the most significant bit (MSB), an error is produced of $V/2$. This error is equal to one-half the maximum amplitude of the information signal and in this case a serious transmission degradation results.

To reduce transmission errors, in the prior art, conversion systems for converting the information signal into specified codes, or additional bits for checking the errors are added to the data bits. This makes the digital transmission system more complicated.

It is, therefore, an object of this invention to provide a digital transmission system in which information signals are relatively unaffected by transmission problems.

It is a further object of this invention to provide a digital transmission system which does not require the use of a specified conversion system or additional bits to reduce transmission errors.

SUMMARY OF THE INVENTION

In accordance with the invention, there is provided a digital transmission system in which an information signal is converted into digital data in response to a sampling pulse train, the digital data including, as representative thereof, a plurality of bits differing in significance from each other. Data conversion, such as complementing (inverting) or reversing the order of the plurality of bits, is achieved to obtain converted data. The data conversion is achieved in integral multiples of every other sampling period. The converted data are transmitted through a transmission path or recorded on a recording medium. The received or reproduced converted data are reconverted back to the original digital data and the original digital data are then reconverted into an analogue signal.

The features and advantages of this invention will be better understood from the following detailed description of preferred embodiments when taken in conjunction with the accompanying drawings.

BRIEF DESCRIPTION OF THE DRAWINGS

In the Drawings:

FIG. 1 is a block diagram of a transmitter of a first embodiment of this invention;

FIGS. 3A to 3H are waveform diagrams of signals appearing at various parts of the transmitter shown in FIG. 1;

FIG. 4 is a block diagram of a receiver of the first embodiment of this invention;

FIGS. 5A to 5G are waveform diagrams of signals appearing at various parts of the receiver shown in FIG. 4;

FIG. 7 is a block diagram of a third embodiment of this invention;

FIGS. 8A to 8E are waveform diagrams of signals appearing at various parts of the third embodiment shown in FIG. 7;

FIGS. 11A to 11I are waveform diagrams of signals appearing at various parts of the transmitter shown in FIG. 10.

DETAILED DESCRIPTION

Figure 2:
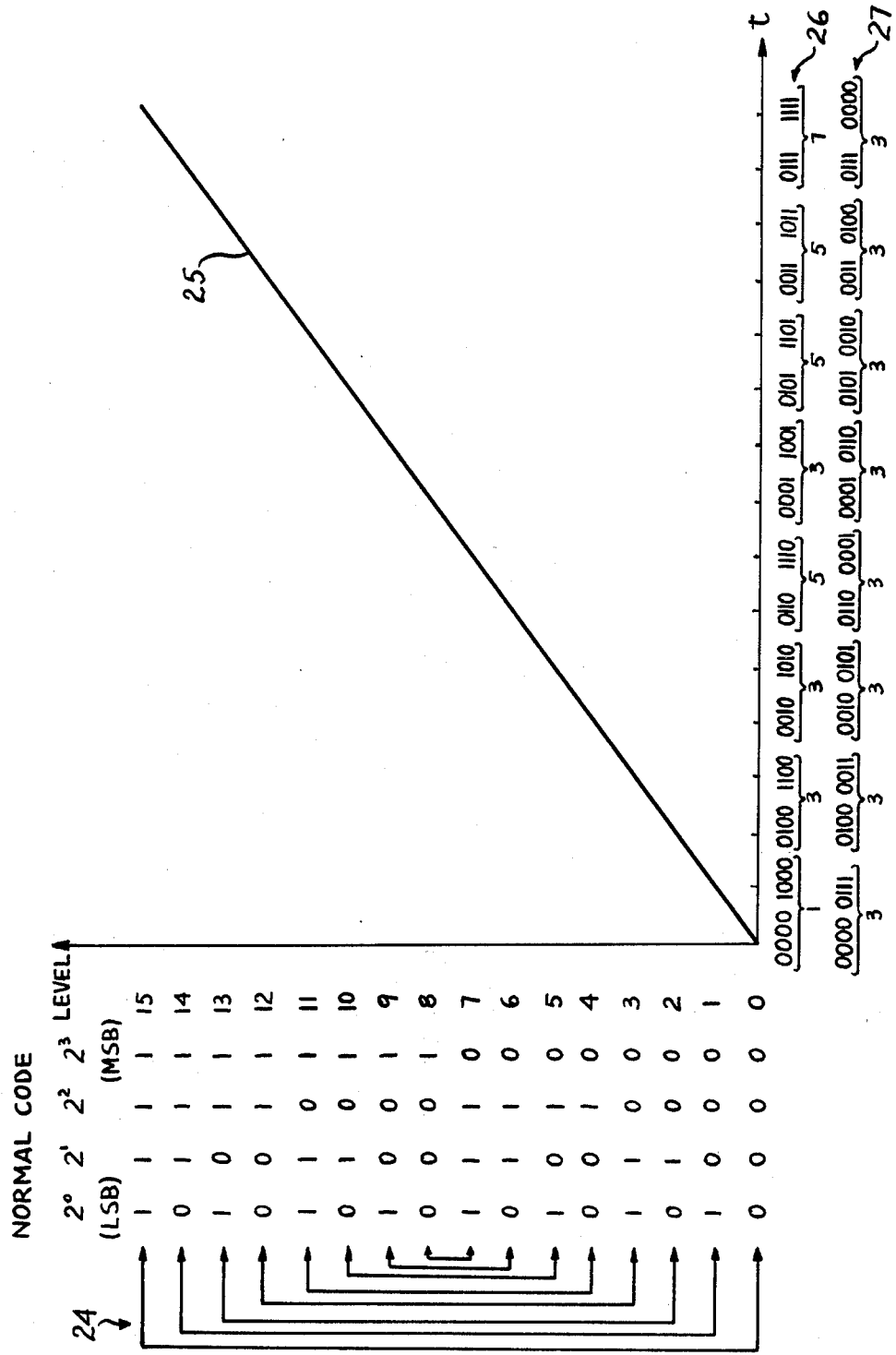
FIG. 2 shows the relationship between a normal code and a level of an information signal to be converted.

Referring to FIG. 1, an analogue signal such as an audio signal or a video signal from an input terminal 10 are converted at an analogue-to-digital (A/D) converter 11 into an n-bit (for example, 4-bit) time-parallel digital signal D of normal code as shown in FIG. 2. This A/D conversion is in response to a clock pulse train CP, shown in FIG. 3A, generated from a clock pulse generator 12. The parallel digital signal D (D-1, D-2, D-3, ---) is produced every period of the clock pulse train CP as shown in FIG. 3B. The digital signal D is supplied to an inverter 13 and is inverted, i.e., complemented to produce a complementary digital signal $\overline{D}$. The digital signals D and $\overline{D}$ are supplied to an AND gate 14 and an INHIBIT gate 15, respectively. The clock pulse train CP is also supplied to a flip-flop circuit 16 to produce a gate pulse GP as shown in FIG. 3C. The gate pulse GP is supplied to the AND gate 14 and an inhibit terminal of the INHIBIT circuit 15, whereby the digital signals D and $\overline{D}$ are alternately passed therethrough and supplied to an OR gate 17 to produce a converted digital signal RD comprised of a series of the digital signals D and $\overline{D}$ ($\overline{D\text{-}1}$, D-2, $\overline{D\text{-}3}$, ---) as shown in FIG. 3D.

The converted digital signals RD are supplied to flip-flop circuits 18-1 to 18-4 in such a manner that the parallel bits of the signal RD are supplied to set terminals S of the corresponding flip-flop circuits. The flip-flop circuits 18-1 to 18-4, which are supplied with the clock pulse CP at their reset terminals R hold the converted digital signal RD for one repetition period of the clock pulse CP, as shown in FIG. 3E. The outputs of the flip-flop circuits 18-1 to 18-4 are respectively connected to AND gates 19-1 to 19-4, which are supplied from a gate pulse generator 20 with gate pulses GP-1 to GP-4 as shown in FIG. 3G. The gate pulse generator 20, upon receipt of the clock pulse CP, generates gate pulses GP-0 to GP-4, the gate pulses differing in phase from each other by $360°/n+1$. Therefore, the plural n bits (4 bits) held in the flip-flop circuits 18-1 to 18-4 are in turn passed through AND gates 19-1 to 19-4, respectively, and supplied to an OR gate 21, whereby the time-parallel n-bit digital signal is parallel-to-serial converted to produce a time-serial digital signal.

The gate pulse GP, from the flip-flop circuit 16, is also supplied to a monostable multivibrator 22, which generates an identifying pulse IP having a pulse width wider than that of a signal bit. Pulse IP is generated at the time of the gate pulse GP, as shown in FIG. 3F. The identifying pulse IP represents that four signal bits following it, i.e., the signal bits $D_1$, $D_3$, $D_5$ ---, ($D_{1-1}$, $D_{1-2}$, $D_{1-3}$, $D_{1-4}$; $D_{3-1}$, $D_{3-2}$, $D_{3-3}$, $D_{3-4}$; ---) have been complemented. The identifying pulse IP is supplied from the monostable multivibrator 22 to the OR gate 21, which is also supplied with outputs of AND gates 19-1 to 19-4, whereby OR gate 21 outputs an output digital signal OD including the identifying pulse IP, and the serial converted digital signal RD, as shown in FIG. 3H. The output digital signal OD is transmitted from an output terminal 23 through a transmission path or recorded on a recording medium (not shown).

In the first embodiment shown in FIG. 1, the digital signals D (D-1, D-2, D-3, ---) are inverted, i.e., complemented every other sampling period to produce the converted digital signal RD (D-1, D-2, D-3, D-4, D-5, ---), which are then transmitted or recorded. As clearly understood from FIG. 2, in the normal code system, the lower-level-codes having levels 0 to 7 in FIG. 2 are symmetrical, i.e., complementary to the higher-level-codes having levels 8 to 15 as indicated by solid lines 24. Further, FIG. 2 shows that when the signal as indicated in a solid line 25, is coded in accordance with the normal code system, the normal codes 26 are produced, in which the numbers of the bits of a logic "1" level in two adjacent sampling points, are different from each other. When the normal codes 26 are converted in the same manner as in the first embodiment, the converted codes 27 are obtained. In the converted codes 27, the numbers of the bits of a logic "1" level in two adjacent sampling points, are equal to each other. This means that digital transmission utilizing the converted codes makes possible the attainment of uniform transmission power.

Referring to FIG. 4, the digital signal transmitted from the transmitter of FIG. 1 is received and supplied to an input terminal 30 as an input digital signal ID as shown in FIG. 5A. The input signal ID is supplied to an identifying-pulse separator 31 and an inverter 32. The separated identifying pulse IP as shown in FIG. 5B is supplied to a monostable multivibrator 33, which generates, as shown in FIG. 5C, a gate pulse RGP-1 having a pulse width equal to one-half the repetition period of the identifying pulse IP. The gate pulse RGP-1 is supplied to an AND gate 34 and an INHIBIT gate 35, which are supplied with the digital signals from the inverter 32 and the input terminal 30, respectively. Therefore, the digital signals from the inverter 32 and the input terminal 30 are alternatively passed through the gates 34 and 35 and supplied to an OR gate 36, whereby the input digital signal ID is inverted every other sampling period, i.e., reconverted back to the original time-serial digital signal OSD, as shown in FIG. 5D. The time-serial digital signal is supplied to a 4-stage (n-stage) shift resistor 37.

The identifying pulse IP is also supplied to a multiplier 38 for generating a shift pulse SP having a frequency equal to that of the pulse multiplied by $2(n+1)$ (10), as shown in FIG. 5E. The shift pulse SP is supplied to the shift register 37 and controls the shifting of the digital signal OSD. On the other hand, the gate pulse RGP-1 is also applied to a gate pulse generator 39 for generating a gate pulse train RGP-2 at the rising and trailing edges of the gate pulse RGP-1 as shown in FIG. 5F. The gate pulse train RGP-2 is supplied to AND gates 40-1 to 40-4, input terminals of which are connected to the first to fourth stages of the shift registers 37, respectively. Therefore, the signal bits registered in the first to fourth stages of the shift register 37 are simultaneously passed through the AND gates 40-1 to 40-4 every sampling period, whereby the original time-parallel digital signal OPD is obtained at the outputs of the AND gates 40 as shown in FIG. 5G.

The time-parallel digital signal OPD is supplied directly or through a delay means 41, having a delay time equal to the sampling period, to an adder 42. The digital signal from the adder 42 is supplied through an attenuator 43, having a transmission factor of $\frac{1}{2}$, to a digital-to-analogue (D/A) converter 44 and converted back to the analogue signal.

Figure 6:
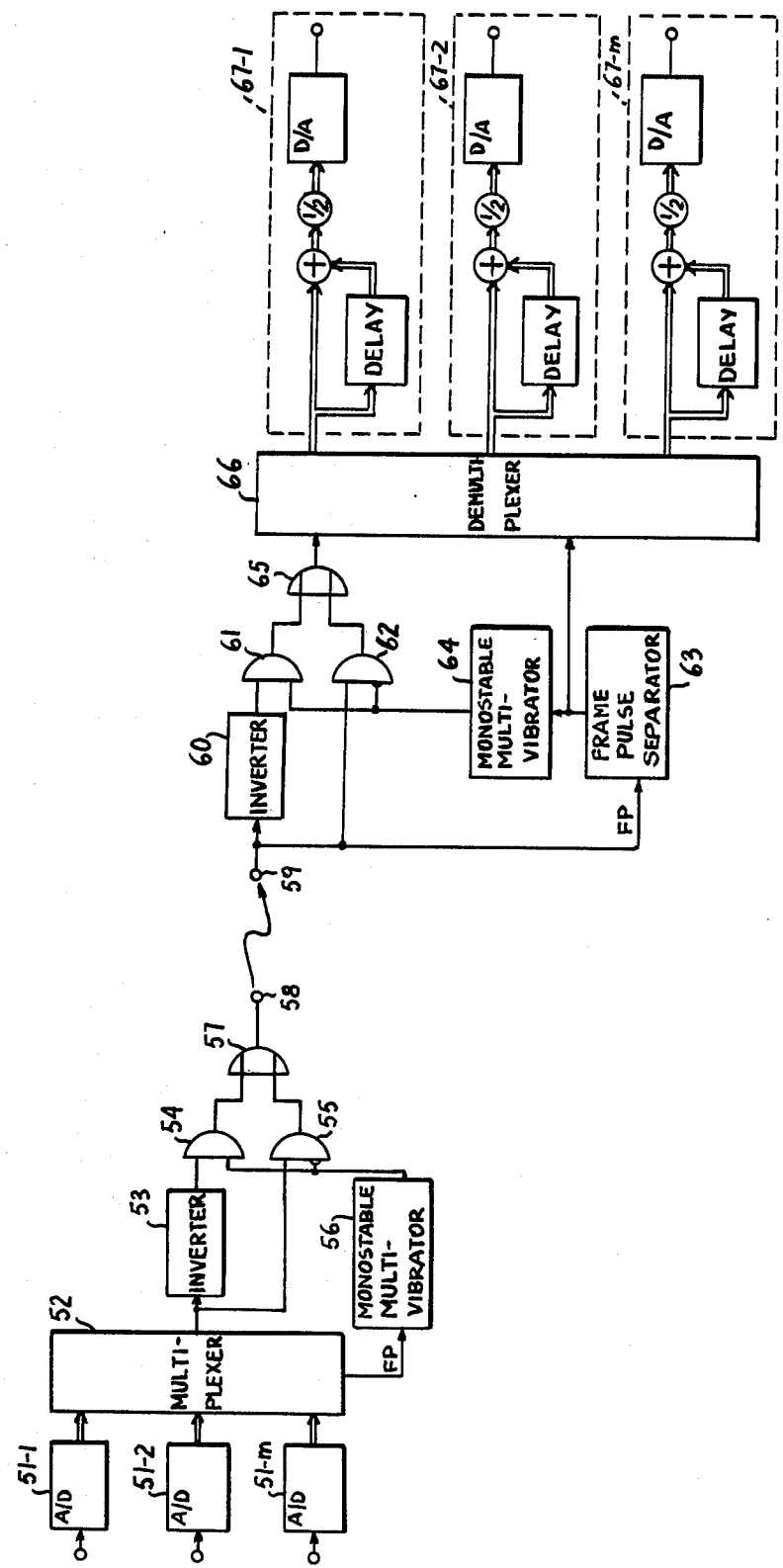
FIG. 6 is a block diagram of a second embodiment of this invention.

FIG. 6 shows a second embodiment of this invention as applied to a time-division-multiplex (TDM) PCM transmission system. The second embodiment comprises a plurality of A/D converters 51 (51-1, 51-2, --- 51-m) and a multiplexer 52 for multiplexing the digital data from the A/D converters 51 and a frame pulse FP in time division fashion. The TDM signal from the multiplexer 52 is supplied through an inverter 53 or directly to an AND gate 54 and an INHIBIT gate 55. On the other hand, the frame pulse FP from the multiplexer 52 is supplied to a monostable multivibrator 56, which generates a gate pulse having a pulse width equal to one-half the repetition period of the frame pulse FP. The gate pulse from the multivibrator 56 is supplied to the AND gate 54 and the INHIBIT gate 55, whereby the converted TDM signal is passed through an OR gate 57 and transmitted from an output terminal 58.

The transmitted converted TDM signal is received at an input terminal 59 and supplied through an inverter 60, or directly, to an AND gate 61 and an INHIBIT gate 62, respectively. The re-converted TDM signal is also supplied to a frame pulse separator 63. The frame pulse FP from the separator 63 is supplied to a monostable multivibrator 64 identical to the multivibrator 56. The gate pulse from the multivibrator 64 is supplied to the gates 61 and 62, whereby the original TDM signal is obtained from an OR gate 65 and supplied to a demultiplexer 66, which is supplied with the frame pulse FP from the separator 63.

The demultiplexer 66 demultiplexes the TDM signal to the m-channel signals, which are supplied to corresponding converting means 67-1, 67-2, --- 67-m, each comprising the delay means, adder, attenuator and D/A converter.

Referring to FIG. 7, the third embodiment comprises a transmitter 71, identical to the transmitter shown in FIG. 1, for producing the converted signal OD, as shown in FIG. 8A, and a modulator 72 for modulating the converted signal OD by an analogue signal AS as shown in FIG. 8B. Signal OD can also be modulated by a digital signal DS to produce a modulated signal MS as shown in FIG. 8C or MS' as shown in FIG. 8E. The third embodiment further comprises an amplitude separator 73, a receiver 74 identical to the receiver shown in FIG. 4, and a demodulator 75 for demodulating the amplitude components from the separator 73.

In the third embodiment, an audio signal can be transmitted together with the converted digital video signal. Further, the identifying pulse can be superimposed as the digital signal DS instead of inserting it between the signal bits in time-division fashion.

Figure 9:
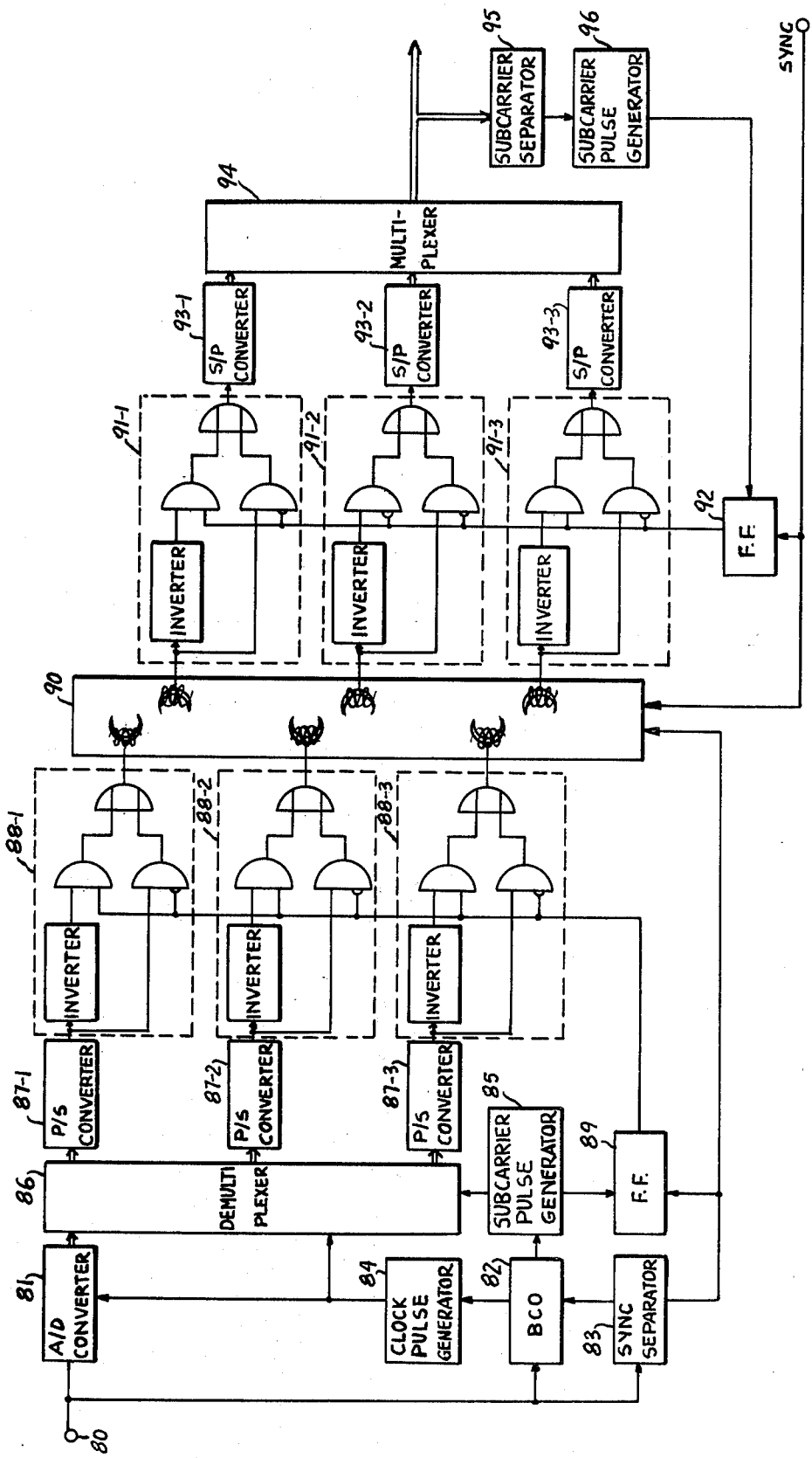
FIG. 9 is a block diagram of a fourth embodiment of this invention.

FIG. 9 shows a fourth embodiment of this invention as applied to a PCM VTR (video tape recorder). An analogue video signal is supplied from an input terminal 80 to an A/D converter 81, a burst controlled oscillator (BCO) 82 and a sync separator 83. The BCO 82 is also supplied with a synchronizing signal separated at the sync separator 83. The BCO 82 generates a subcarrier wave of 3.58 MHz. The subcarrier wave is supplied to a clock pulse generator 84 to produce a clock pulse of 10.74 MHz. The clock pulse is supplied to the A/D converter 81, which encodes the input video signal into a time-serial n-bit digital video signal having a clock frequency of 10.74 MHz.

The subcarrier wave from the BCO is also supplied to a subcarrier pulse generator 85 to produce a subcarrier pulse of 3.58 MHz. The subcarrier pulse is supplied to a demultiplexer 86 comprised of 3-stage shift registers and AND gates, which are supplied with the time-parallel digital video signal and the clock pulse of 10.74 MHz. In the demultiplexer 86, the signal bits of the time-parallel digital video signal are supplied to the shift registers, which are also supplied with the clock pulse as a shift pulse. The first, second and third stages of the shift registers are connected to the corresponding AND gates, which are also supplied with the subcarrier pulse. The demultiplexer 86 generates three time-parallel digital video signals each having a clock frequency of 3.58 MHz.

The digital video signals from the demultiplexers 86 are supplied to parallel-to-serial converters 87-1, 87-2 and 87-3 to produce time-serial digital signals, which are supplied to processors 88-1, 88-2 and 88-3 each comprised of the inverter, AND gate and INHIBIT gate. The AND and INHIBIT gates are supplied with a gate pulse from a flip-flop circuit 89, which is supplied with the subcarrier pulse, and a horizontal synchronizing signal from the sync separator 83 as a trigger signal. The processors 88-1, 88-2 and 88-3 generate three converted time-serial digital video signals, which are then supplied to three recording heads of a PCM VTR 90 and recorded on a recording medium (not shown).

The recorded signals are reproduced by three reproducing heads of the PCM VTR 90. The reproduced signals are supplied to processors 91-2, 91-2 and 91-3, each composed of the inverter, AND gate and INHIBIT gate, which are supplied with a gate pulse from a flip-flop circuit 92 identical to the flop-flop circuit 89. The processors 91-1, 91-2 and 91-3 reconvert the converted time-serial digital signals back to the original time-serial digital signals, which are then serial-to-parallel converted at S/P the serial-to-parallel converters 93-1, 93-2 and 93-3 to produce the time-parallel digital video signals. The time-parallel signals are supplied to a multiplexer 94 to produce the original time-parallel digital video signal having the clock frequency of 10.74 MHz.

The digital video signal from the multiplexer 94 is supplied to a subcarrier separator 95 for separating the subcarrier wave, which is then supplied to a subcarrier pulse generator 96 identical to the generator 85. The subcarrier pulse from the subcarrier pulse generator 96 is supplied to the flip-flop circuit 92, which is supplied with a horizontal synchronizing signal from a terminal SYNC.

Figure 10:
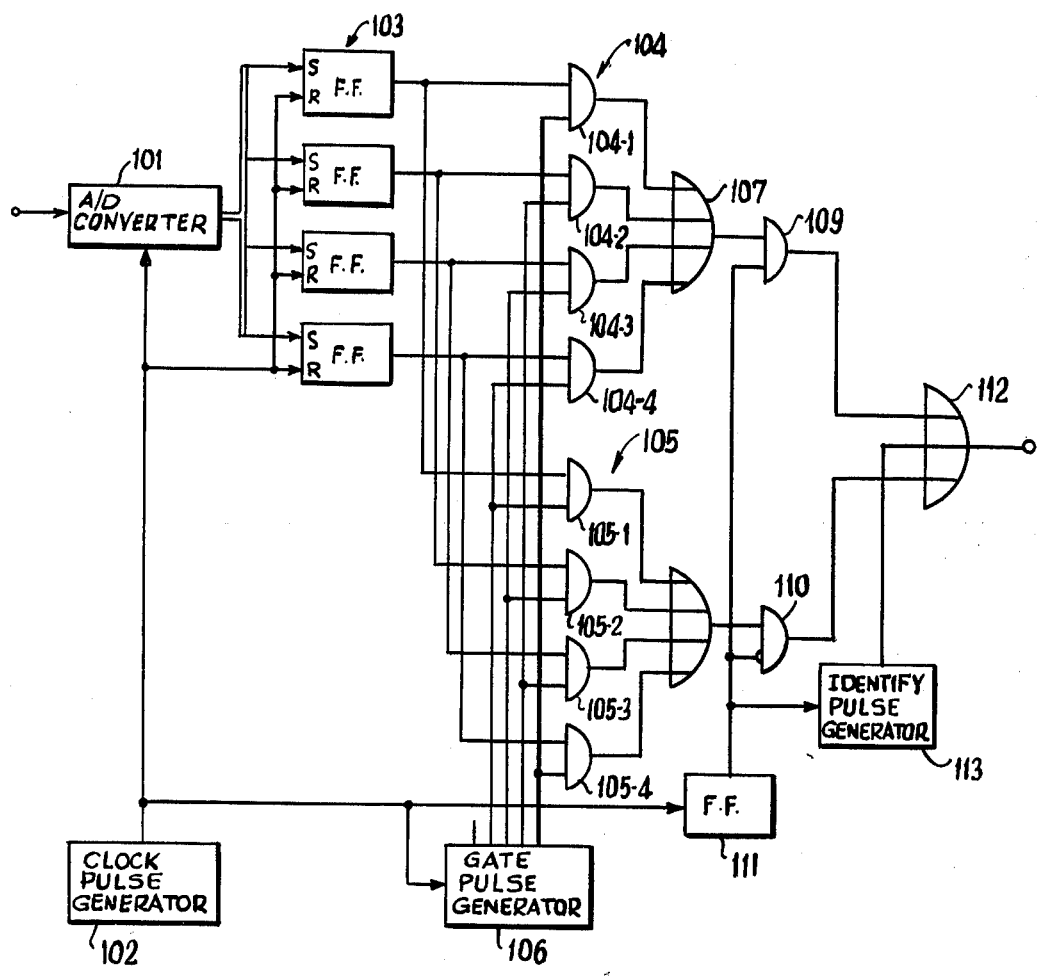
FIG. 10 is a block diagram of a transmitter of a fifth embodiment of this invention.
Figures 11A, 11B, 11C, 11D, 11E, 11F, 11G, 11H, 11I:
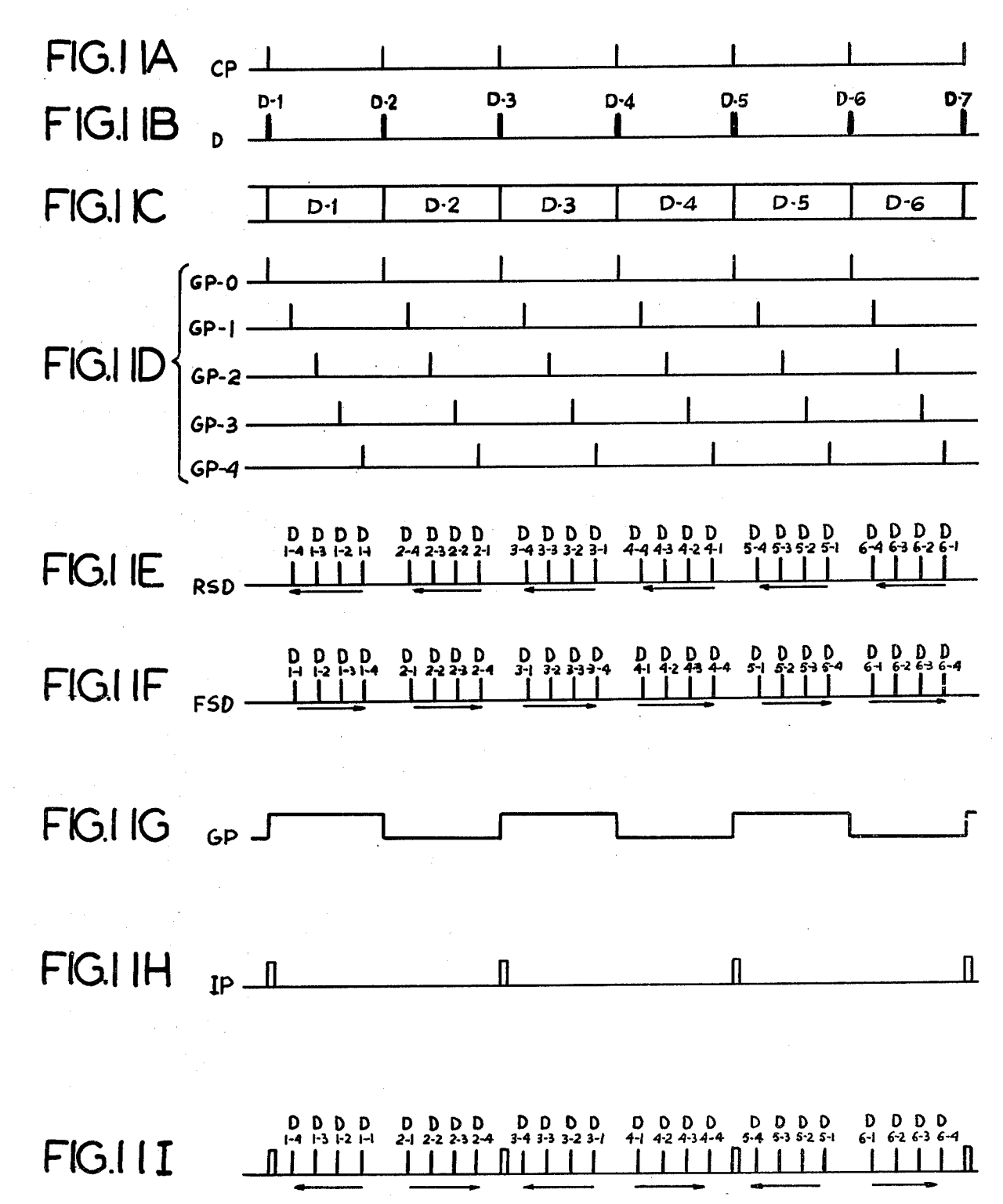

Referring to FIG. 10, the fifth embodiment comprises the A/D converter 101 for producing the time-parallel digital signal D as shown in FIG. 11B in response to the clock pulse CP from the clock pulse generator 102. The bits of the time-parallel digital signal D are supplied to the flip-flop circuits 103, which are supplied with the clock pulse CP as the reset pulse. The flip-flop circuits 103 generate the time-parallel signal as shown in FIG. 11C, which is then supplied to the AND gates 104 and 105.

The clock pulse CP is also supplied to the gate pulse generator 106, identical to the generator 20, which generates the gate pulses GP-0 to GP-4 as shown in FIG. 11D. Gate pulse GP-1 is supplied to the AND gates 104-4 and 105-1, GP-2 to 104-3 and 105-2, GP-3 to 104-2 and 105-3, and GP-4 to 104-1 and 105-4. Therefore, the OR gate 107 connected to the AND gates 104 produces the time-serial signal RSD as shown in FIG. 11E, and the OR gate 108 connected to the AND gates 105 produces the time-serial signal FSD having a reverse order of bits to that of the signal RSD, as shown in FIG. 11F. The time-serial signals RSD and FSD are supplied to the AND gate 109 and the INHIBIT gate 110, which are also supplied with the gate pulse GP (FIG. 11H) from the flip-flop circuit 111, identical to the circuit 16 (FIG. 1). The signals RSD and FSD are alternatively supplied from the gates 109 and 110 to the OR gate 112, which is also supplied with the identifying pulse IP from the pulse generator 113 identical to the vibrator 22 (FIG. 1), whereby the output signal OD' as shown in FIG. 11I is obtained from the OR gate 112.

Figure 12:
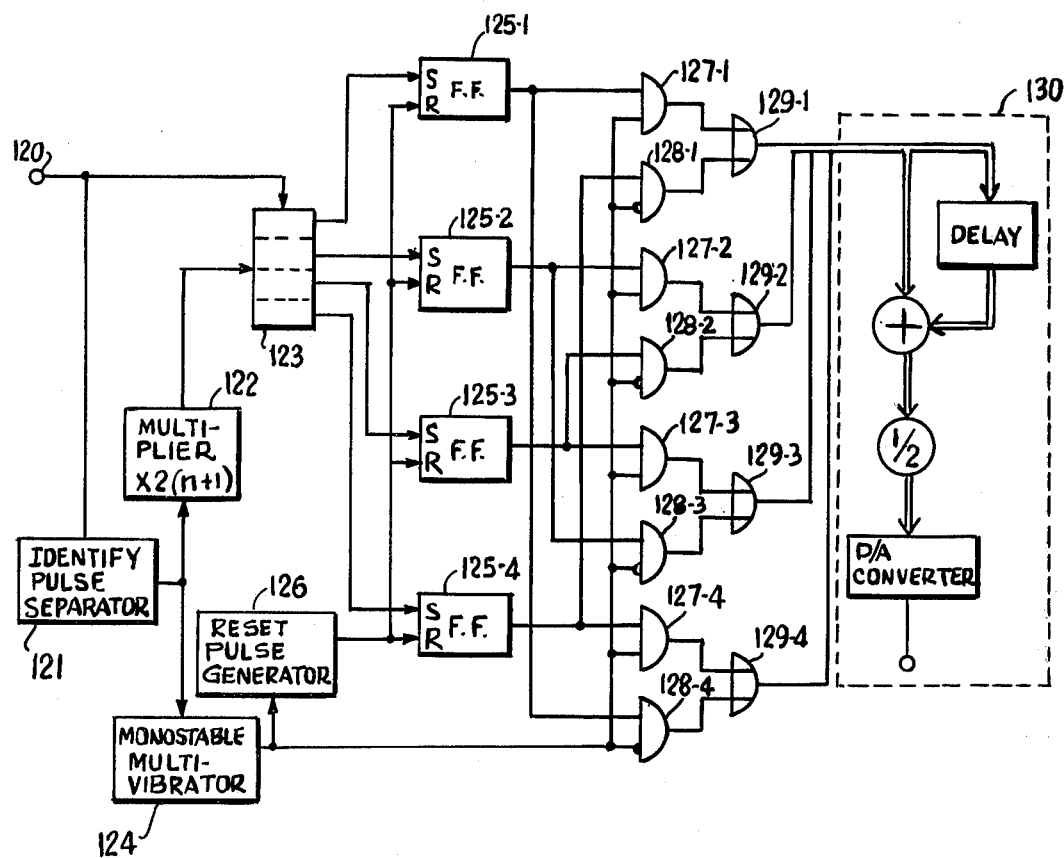
FIG. 12 is a block diagram of a receiver of the fifth embodiment of this invention.

Referring to FIG. 12, the fifth embodiment further comprises the identifying pulse separator 121, the multiplier 122, the shift register 123, and the monostable multivibrator 124 identical to those in FIG. 4. The first to fourth stages of the shift register 123 are connected to the flip-flop circuits 125-1 to 125-4, which are supplied with a reset pulse from a reset pulse generator 126 identical to the pulse generator 39 (FIG. 4).

The outputs of the flip-flop circuits 125 are connected to the AND gates 127 and the INHIBIT gates 128 in such a manner that the flip-flop circuit 125-1 is connected to the gates 127-1 and 128-4, 125-2 to 127-2 and 128-3, 125-3 to 127-3 and 128-2, and 125-4 to 127-4 and 128-1. The gate pulse from the monostable multivibrator 124 is supplied to the gates 127 and 128, whereby the original time-parallel digital signal is obtained from the OR gates 129 (129-1 to 129-4) and is then supplied to the converting means 130 composed of the delay means, adder, attenuator, and D/A converter.

In the above embodiments, the information signal is converted into the digital signal in accordance with the normal code system, and then the digital signal is complemented or reversed in the order of the signal bits. It is noted that only the specified bit or bits in each code can be complemented. For example, in the case where the information signal is encoded in accordance with the Gray code in which the MSB's are symmetrical, only the MSB can be complemented in integral multiples of every other sampling period multiplied by an integer. Further, it is possible to complement at least one bit in each code in the case of the normal code system.

In the recording of the digital signal, the digital signal $\overline{D}$ and the complemented digital signal D can be simultaneously recorded on different tracks. Further, in the case of stereophonic signals L and R, or L+R and L−R, one of the signals is encoded and directly recorded on one of the tracks, while the other encoded signal is complemented and recorded on the other tracks. It is also possible to apply this invention to a spread spectrum communication system. Although specific embodiments of this invention have been shown and described, it will be understood that various modifications may be made without departing from the spirit of this invention.

What is claimed is:

1. A digital transmission system comprising:

Means responsive to a sampling pulse, occurring during successive sampling periods, for encoding an information signal into a digital signal at each of said sampling periods, said digital signal including a plurality of bits differing in significance from each other;

means for converting said digital signal at integral multiples of every other sampling period to produce a converted digital signal;

means for transmitting said converted digital signal to receiving apparatus, said plurality of bits in each sampling period being transmitted in time-serial sequence; and means included in said receiving apparatus for reconverting said converted digital signal back into said digital signal.

2. A digital transmission system in accordance with claim 1, wherein said converting means includes means for complementing said digital signal at integral multiples of every other sampling period.

3. A digital transmission system in accordance with claim 1, wherein said converting means includes means for reversing the order of said plurality of bits at integral multiples of every other sampling period.

4. A digital transmission system in accordance with claim 2, wherein said complementing means includes means for inverting said digital signal, said digital signal and said inverted digital signal being supplied to one input of an AND gate and one input of an INHIBIT gate respectively, a remaining input of said AND gate and said INHIBIT gate being supplied with a gating pulse derived from said sampling pulse.

5. A digital transmission system in accordance with claim 4, wherein the output of said AND gate and said INHIBIT gate are applied to respective inputs of an OR gate to produce said converted digital signal.

6. A digital transmission system in accordance with claim 3, wherein said reversing means includes a plurality of flip-flops, said plurality of flip-flops being respectively set by said plurality of bits, and reset by said sampling pulse, two groups of gates each group having a plurality of AND gates and an OR gate, said gate groups providing two sets of time-serial digital signals differing in the order of said plurality of bits from each other, and an INHIBIT gate, said two sets of time-serial digital signals being applied to one input of said AND and INHIBIT gates, and other inputs of said AND and INHIBIT gates being supplied with a control signal derived from said sampling pulse.

7. A digital transmission system in accordance with claim 1 further comprising means for amplitude-modulating said converted digital signal by an additional signal.

* * * * *